United States Patent [19]

Orthman

[11] 4,065,013

[45] Dec. 27, 1977

[54] FORKLIFT ATTACHMENT FOR MOVING THREE-POINT MOUNTED EQUIPMENT

[75] Inventor: Henry K. Orthman, Lexington, Nebr.

[73] Assignee: Orthman Manufacturing, Inc., Lexington, Nebr.

[21] Appl. No.: 728,292

[22] Filed: Sept. 30, 1976

[51] Int. Cl.[2] .......................... B66F 9/12; B60D 1/04

[52] U.S. Cl. .............................. 214/620; 214/145 A; 214/460 A; 214/461 A

[58] Field of Search .................. 214/145 A, 620, 621, 214/766; 280/415 R, 415 A, 460 A, 461 A, 479 A

[56] References Cited

U.S. PATENT DOCUMENTS

| | | | |
|---|---|---|---|
| 2,386,759 | 10/1945 | Ulm | 214/620 |
| 2,809,759 | 10/1957 | Manker | 214/620 |
| 3,231,294 | 1/1966 | Horney | 280/461 A X |
| 3,587,893 | 6/1971 | Laken | 214/620 |
| 3,829,128 | 8/1974 | Sutton | 280/461 A |
| 3,881,619 | 5/1975 | Morris | 214/620 |

*Primary Examiner*—L. J. Paperner
*Attorney, Agent, or Firm*—Zarley, McKee, Thomte, Voorhees & Sease

[57] ABSTRACT

The spaced apart arms of a forklift vehicle are slidably received in sleeves mounted on the lower ends of spaced apart legs carried on a cross member. Upwardly facing hooks are provided on each of the legs and cross member for detachable engagement with hitch pins on a three-point mounted implement. A U-shaped stop having a cross member and perpendicular legs is pivotally connected through the free ends of the legs to the outer ends of the mounting sleeves opposite the hooks and is pivotal from a horizontal position for engagement with the standard of a forklift vehicle to an upstanding inoperative position.

6 Claims, 4 Drawing Figures

FORKLIFT ATTACHMENT FOR MOVING THREE-POINT MOUNTED EQUIPMENT

BACKGROUND OF THE INVENTION

Three-point mounted equipment is not usually equipped with transport wheels so it must be lifted off the ground and carried for transport from one location to another. It can become very much of a chore to attempt to hook up to the tractor's three-point hitch each time a machine needs to be moved or loaded on to a trailer. Accordingly, a device is needed that will permit easy moving of three-point mounted equipment.

SUMMARY OF THE INVENTION

The device of this invention allows for the use of a commonly available forklift vehicle in the moving of three-point mounted equipment. Simply stated, the attachment or device of this invention merely connects the three-point mounted implement to the forklift and then the forklift is free to move the implement from one location to another and if desired, onto a trailer for transport purposes. The device may be easily removed from the forklift as it includes sleeves on the bottom ends of upstanding legs which receive the forwardly extending arms on the forklift vehicle. The three-point implement hitch pins are received in upwardly facing hooks on the legs of the device and on a cross member interconnecting the legs at their upper ends. In order to space the device at a desired distance from the standard of the forklift vehicle a pivotal U-shaped stop member is connected through its legs to the outer free ends of the mounting sleeves whereby the stop member may be pivoted from an operative horizontal position for engagement with the standard at a point just above the arms of the forklift vehicle to an upstanding position which allows the device to be mounted in close proximity to the forklift standard.

DESCRIPTION OF THE PREFERRED EMBODIMENT

Figure 1:
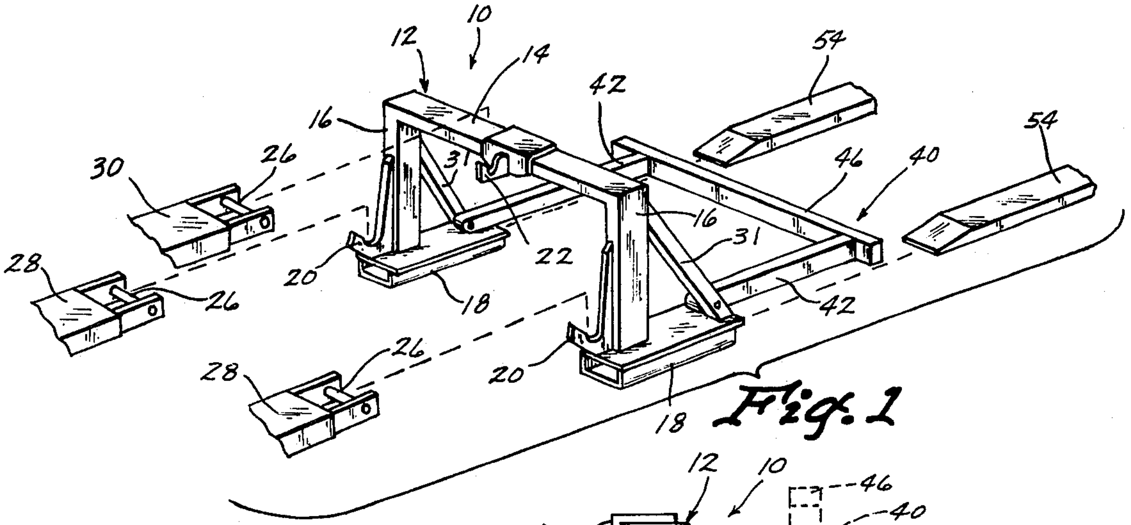
FIG. 1 is an exploded fragmentary perspective view of the forklift attachment for moving three-point mounted equipment and also showing the forklift arms and three-point hitch pins on the three-point mounted implement.
Figure 2:
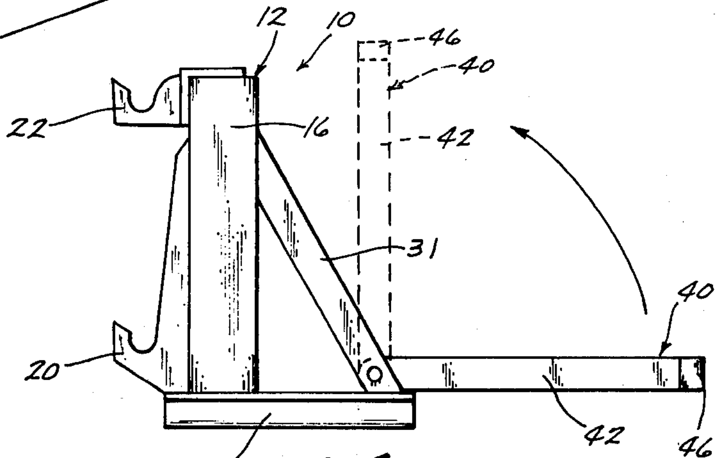
FIG. 2 is a side elevation view of the forklift attachment.

The forklift attachment of this invention is referred to generally in FIG. 1 by the reference numeral 10 and includes a frame 12 having a cross member 14 with downwardly extending oppositely disposed legs 16 having rectangular in cross section open ended sleeves 18 on their lower ends. The forward side of the forklift attachment includes upwardly facing hooks 20 on each of the legs 16 and a hook 22 on the cross member 14. The hooks 20 and 22 are for detachable engagement with the hitch pins 26 on three-point mounted implement brackets 28 and 30 connected to an implement not shown.

The rear side of the frame 14 includes braces 31 extending from the upper ends of the legs 16 downwardly and forwardly into engagement with the outer free ends of the mounting sleeves 18.

A U-shaped stop member 40 is pivotally connected through the outer free ends of legs 42 to the lower ends of the braces 31. The opposite ends of the legs 42 are interconnected by a cross member 46.

Figure 3:
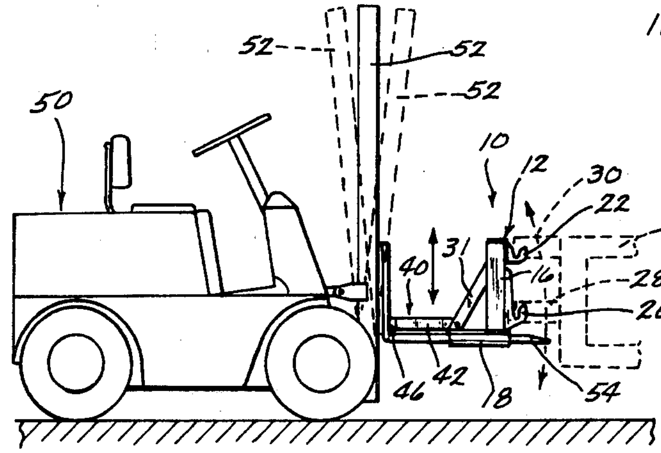
FIG. 3 is a side elevation view of the forklift attachment mounted on a forklift vehicle and further illustrating the pivotal movement of the forklift.
Figure 4:
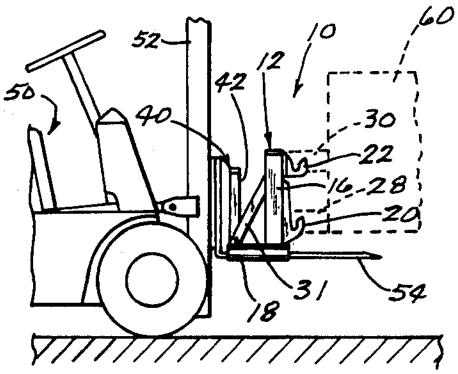
FIG. 4 is a view similar to FIG. 3 but showing the pivotal stop in its raised position allowing the forklift attachment to be mounted in closer proximity to the forklift standard.

In operation it is seen that a forklift vehicle 50 having a standard 52 and forwardly extending spaced apart arms 54 is capable of pivoting between the dashline positions, as seen in FIG. 3, and thereby tipping the forwardly extending arms 54 through an angle of at least 5°. The forklift arms 54 are lowered to the ground and the vehicle is driven forwardly such that the arms 54 are received in the mounting sleeves 28 on the forklift attachment 10. If it is desired to mount the attachment 10 in close proximity to the standard 52 the stop 40 is pivoted to the upstanding position of FIG. 4 and the arms 54 are slid all the way through the mounting sleeves 28. On the other hand, if it is desired to maintain the attachment 10 on the outer ends of the arms 54 the stop member 40 is pivoted to its lowered position, as seen in FIG. 3, whereby the cross member 46 engages the standard 52 at a point just above the connection of the arms 54 to the standard.

The forklift truck is then driven to an implement 60 and lowered sufficiently for the hooks 20 and 22 to be positioned directly under the hitch pins 26 whereupon the forklift arms 54 are raised causing the hooks to engage the pins and thereby raising the implement 60 for transporting to another location or onto a trailer. This engagement from the implement is easily accomplished by lowering the forklift arms 54 and the hooks 20 and 22 become disengaged from the hitch pins 26. The forklift attachment 10 is disengaged from the forklift arms 54 by merely lowering it to the ground such that the bottom sides of the sleeves 28 engage the ground frictionally and hold it on the ground as the forklift truck is backed away thereby withdrawing the forklift arms 54 from the sleeves 28.

I claim:

1. A forklift attachment for moving three-point mounted equipment comprising,
   - an upstanding frame having a cross member and oppositely disposed legs,
   - connecting means on each leg adapted to detachably engage the arms of a forklift vehicle,
   - connecting means on each leg and on said cross member adapted to detachably engage the connecting means on a three-point mounted implement, and
   - a stop means on said frame for selectively spacing said frame from a forklift vehicle by said stop being positioned to engage the upstanding standard on the forklift vehicle, said stop being U-shaped and having a cross member and perpendicularly extending oppositely disposed arms pivotally and operatively connected to said frame legs.

2. The structure of claim 1 wherein said connecting means adapted to engage the legs of a forklift vehicle are further defined as being sleeves on the bottom ends of said oppositely disposed legs for slidably receiving said forklift arms.

3. The structure of claim 1 wherein said connecting means on each leg and on said cross member adapted to detachably engage the connecting means on a three-point mounted implement being further defined as being upwardly facing open hooks adapted to engage the hitch pins on a three-point mounted implement.

4. The structure of claim 3 wherein said frame is further defined as being an inverted U in shape and open between said legs.

5. The structure of claim 1 wherein said stop is pivotally connected to said frame and pivotal between a lowered horizontal position parallel and over arms on a forklift vehicle to a raised position substantially parallel with said upstanding frame.

6. The structure of claim 1 wherein said arms are connected to the lower ends of said frame legs.

* * * * *